UNITED STATES PATENT OFFICE.

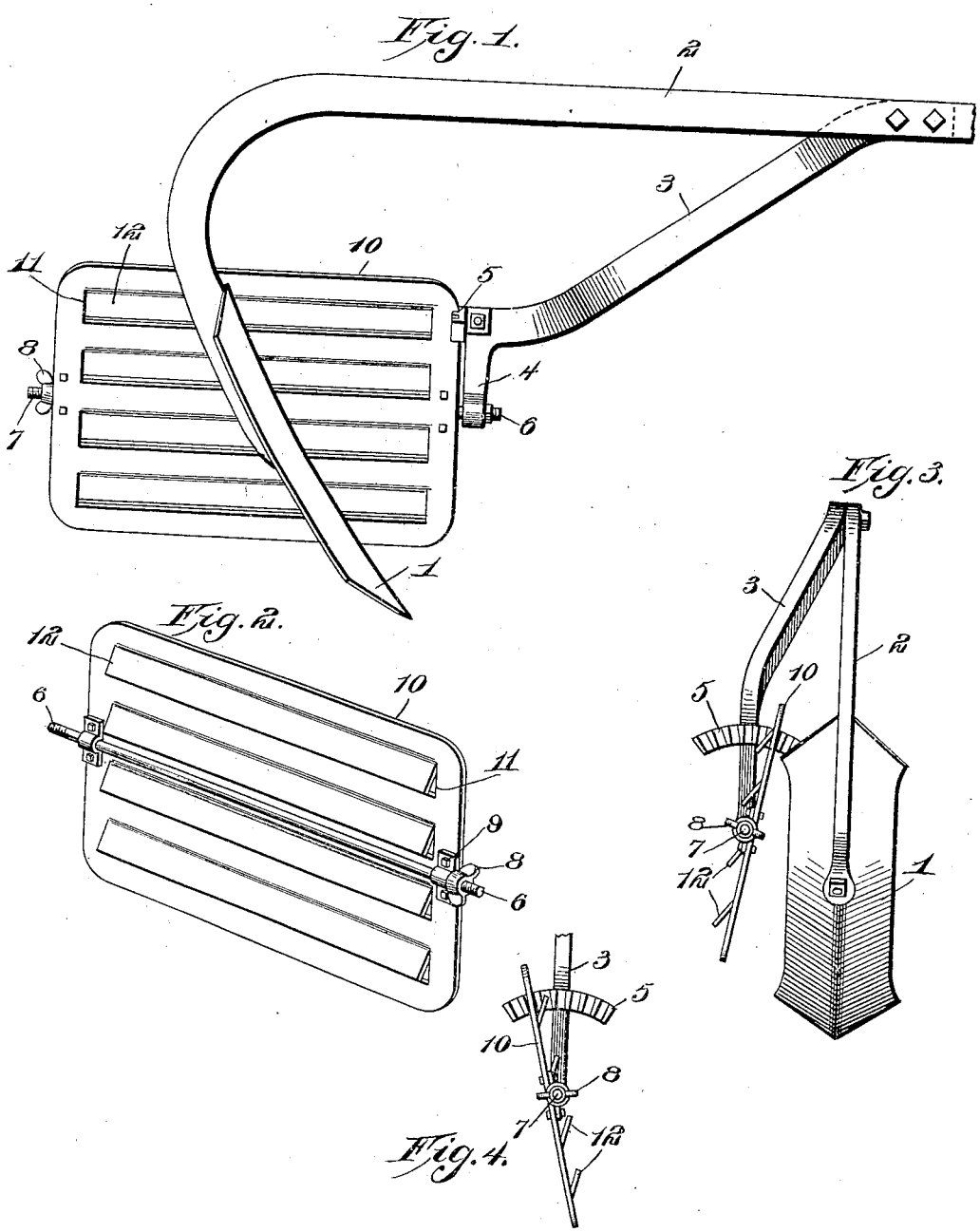

HARRY H. DENNIS, OF LUNDA, OHIO.

SHIELD ATTACHMENT FOR CULTIVATORS.

No. 810,628.   Specification of Letters Patent.   Patented Jan. 23, 1906.

Application filed August 28, 1905. Serial No. 276,148.

*To all whom it may concern:*

Be it known that I, HARRY H. DENNIS, a citizen of the United States, residing at Lunda, in the county of Union and State of Ohio, have invented certain new and useful Improvements in Shield Attachments for Cultivators; and I do hereby declare the following to be a full, clear, and exact description of the invention, such as will enable others skilled in the art to which it appertains to make and use the same.

My invention relates to cultivators; and it is more particularly a shield attachment adapted to be used in connection with cultivators of different forms and which serves to prevent clods, stones, &c., from falling upon plants during the cultivation of the soil.

A still further object is to provide an adjustable shield which may be so disposed as to direct dirt after the same has been passed therethrough into proper position upon the plant.

With the above and other objects in view the invention consists of an arm adapted to be secured to the beam of the cultivator, and extending rearwardly from this arm is a rod on which is rotatably mounted my improved shield. This shield has a series of parallel longitudinally - extending slats from which extend inclined flanges which are so disposed as to direct dirt into proper position after the same has been forced through the slots formed between the slats.

The invention also consists of novel means for locking the shield in adjusted position.

The invention also consists of certain other features of construction and combinations of parts which will be more fully described, and pointed out in the claims.

In the accompanying drawings I have shown the preferred form of my invention.

In said drawings, Figure 1 is a side elevation of a portion of a cultivator having my improved shield thereon. Fig. 2 is a perspective view showing the other side of the shield. Fig. 3 is a rear elevation of the parts shown in Fig. 1; and Fig. 4 is an end view of the shield, showing the same reversed.

Referring to the figures by numerals of reference, 1 is a point or shovel of a cultivator secured to a beam 2, and extending downwardly and laterally from this beam is an arm 3, which is rigidly fastened to the beam in any preferred manner and has a hanger 4 at its rear end. A curved rack 5 is secured to the end of arm 3 and extends laterally therefrom, and extending rearwardly from hanger 4 is a rod 6, having its end 7 threaded for engagement by a thumb-nut 8. This rod extends through straps 9, secured at the center of the ends of my improved shield 10. This shield is preferably formed in a single sheet of metal having rounded corners, and parallel longitudinally-extending slots 11 are formed within the plate, and the metal displaced in their production is bent laterally to constitute inclined flanges 12.

By tightening the nut 8 the shield 10 may be pressed forward into engagement with any of the teeth of rack 5, and said shield will therefore be held rigidly in any position to which it may be adjusted. The shield is so disposed in relation to the shovel 1 that the flanges 12 can be caused to extend upward toward the shovel or by reversing the shield they can be caused to extend downward and away from the shovel. I have shown these two positions in Figs. 4 and 3, respectively. When the flanges are disposed in the position shown in Fig. 3, the dirt thrown upward by the shovel 1 will fall against the shield and will pass through the slots 11. The downwardly-inclined flanges will direct this dirt laterally away from the shield, so that it will fall upon the plants. At the same time clods and stones will be prevented from passing through the shield, because the slots are of such a size as to prevent their passage. By reversing the shield so that the same will assume the position shown in Fig. 4 the flanges act as hoppers, and therefore greater quantities of dirt will be conveyed through the slots because when the dirt is thrown upward the flanges will direct it into the slots. With this arrangement, however, the dirt after passing through the slots will fall directly to the ground and will not be thrown laterally as where the parts are disposed in the manner shown in Fig. 3.

One or more of these shields may be used with a cultivator, and same may be disposed at any preferred angle to each other to produce desired results.

Having thus fully described my invention, what I claim as new, and desire to secure by Letters Patent, is—

1. A shield attachment for cultivators comprising a rotatable slotted plate, a support therefor, means for holding the plate against rotation, and an inclined flange extending from one edge of the slot.

2. A shield attachment for cultivators comprising a supporting member, a rotatable longitudinally-slotted plate connected to said member, a flange extending longitudinally upon one side of the plate and from one edge of the slot at an acute angle to the plate, and means for locking the plate against rotation.

3. A shield attachment for cultivators comprising a supporting-arm, a shield-plate rotatably connected to the arm, means for locking the plate to the arm to prevent rotation, said plate having a plurality of longitudinally-extending slots, and longitudinally-extending flanges projecting from the edges of the slots at acute angles to the plate.

4. A shield attachment for cultivators comprising a supporting-arm, a rod extending therefrom, a longitudinally-slotted plate rotatably mounted upon the rod, plate-engaging means on the arm, means for locking the plate in engagement with said means, and flanges extending from the plate and adjacent the slots at acute angles to the plate.

5. A shield attachment for cultivators comprising an arm having a rack thereon, a rod extending from the arm, a plate rotatably mounted upon the rod and adapted to engage the rack, said plate having a plurality of longitudinally-extending slots therein, means for locking the plate in engagement with the rack, and flanges upon the plate and adjacent the slots, said flanges being disposed at acute angles to the plate.

In testimony whereof I have signed my name to this specification in the presence of two subscribing witnesses.

HARRY H. DENNIS.

Witnesses:
  P. M. KELLER,
  A. D. PETERSON.